(12) United States Patent
Hirota et al.

(10) Patent No.: US 7,326,466 B2
(45) Date of Patent: Feb. 5, 2008

(54) IMPACT ENERGY ABSORBING STRUCTURE

(75) Inventors: Tomoo Hirota, Ichihara (JP); Yoshiaki Togawa, Kyoto (JP)

(73) Assignee: Sumitomo Chemical Co., Ltd., Osaka (JP)

( * ) Notice: Subject to any disclaimer, the term of this patent is extended or adjusted under 35 U.S.C. 154(b) by 551 days.

(21) Appl. No.: 10/247,819

(22) Filed: Sep. 20, 2002

(65) Prior Publication Data

US 2003/0102628 A1    Jun. 5, 2003

(30) Foreign Application Priority Data

Sep. 21, 2001    (JP) .......................... P2001-288731

(51) Int. Cl.
*B32B 9/00* (2006.01)
*F16F 7/12* (2006.01)

(52) U.S. Cl. .................. 428/411.1; 188/371; 188/376; 188/377

(58) Field of Classification Search ................ 428/119, 428/120, 411.1; 296/70, 39.1; 293/132, 293/133, 146, 149, 151, 152; 280/751, 752; 188/371, 376, 377
See application file for complete search history.

(56) References Cited

U.S. PATENT DOCUMENTS 5,749,193 A * 5/1998 Bucher .................... 52/506.06

6,247,745 B1 * 6/2001 Carroll et al. .............. 188/371

OTHER PUBLICATIONS

Naick et al., "Theoretical Relationship of HIC_d to Crush Space for FMVSS-201 Head Impact Tests, and the Effective Use of FEA in Predicting HIC for Design, Verification and Optimization of Countermeasures," (SAE Paper No. 982349), 1996.
Lim et al., "Estimating the Minimum Space to Meet Federal Interior Head Impact Requirement," Feb. 1, 1995, pp. 1-11, SAE Paper No. 950333.

* cited by examiner

*Primary Examiner*—Ramsey Zacharia
(74) *Attorney, Agent, or Firm*—Fitch Even Tabin & Flannery

(57) ABSTRACT

An object of the invention is to provide an impact energy absorbing structure in the form of resin moldings such as interior components of automobiles and other impact energy absorbing structures, with better impact properties, particularly the performance in absorbing impact energy to passenger heads. The invention relates to an impact energy absorbing structure for absorbing the kinetic energy of a colliding object by means of its own deformation, wherein when a certain colliding object collides with the impact energy absorbing structure at a certain velocity, the relationship between dimensionless displacement D, where the deformation of the impact energy absorbing structure is normalized by the permissible deformation, and the dimensionless energy E, where the kinetic energy absorbed by the impact energy absorbing structure is normalized by the kinetic energy of the colliding object prior to collision, meets E>D.

11 Claims, 13 Drawing Sheets

IMAGE OF IMPACT ENERGY ABSORBING
PROPERTIES OF STRUCTURES

IMPACT ENERGY ABSORBING STRUCTURE

DIRECTION OF COLLISION

COLLIDING OBJECT

IMAGE OF EVALUATION METHOD OF STRUCTURE

IMAGE OF IMPACT ENERGY ABSORBING PROPERTIES OF STRUCTURES nth INTERVAL
ABSORPTION ENERGY OF STRUCTURE
($\alpha_n$ TIMES THE KINETIC ENERGY OF
FMH AFTER PASSING THROUGH n-1th INTERVAL)

$$\alpha_n E_{n-1} = F_n \Delta x = m\, a_n \Delta x$$
$$a_n = \alpha_n E_{n-1} / m\Delta x$$

RELATION BETWEEN DEFORMATION AND ACCELERATION
(PERMISSIBLE DEFORMATION 10 mm)

RELATION BETWEEN DEFORMATION AND ACCELERATION
(PERMISSIBLE DEFORMATION 13 mm)

RELATION BETWEEN DEFORMATION AND ACCELERATION
(PERMISSIBLE DEFORMATION 15 mm)

RELATION BETWEEN DEFORMATION AND ACCELERATION
(PERMISSIBLE DEFORMATION 20 mm)

RELATION BETWEEN DEFORMATION AND ACCELERATION
(PERMISSIBLE DEFORMATION 30 mm)

RELATION BETWEEN DEFORMATION AND ACCELERATION
(PERMISSIBLE DEFORMATION 60 mm)

RELATION BETWEEN DEFORMATION
AND ABSROBED KINETIC ENERGY
(PERMISSIBLE DEFORMATION 10 mm)

RELATION BETWEEN DEFORMATION
AND ABSROBED KINETIC ENERGY
(PERMISSIBLE DEFORMATION 13 mm)

RELATION BETWEEN DEFORMATION
AND ABSROBED KINETIC ENERGY
(PERMISSIBLE DEFORMATION 15 mm)

RELATION BETWEEN DEFORMATION
AND ABSROBED KINETIC ENERGY
(PERMISSIBLE DEFORMATION 20 mm)

RELATION BETWEEN DEFORMATION
AND ABSROBED KINETIC ENERGY
(PERMISSIBLE DEFORMATION 30 mm)

RELATION BETWEEN DEFORMATION
AND ABSROBED KINETIC ENERGY
(PERMISSIBLE DEFORMATION 60 mm)

RELATION BETWEEN DEFORMATION AND ABSROBED KINETIC ENERGY

STRUCTURE ALLOWING MEAN REPULSION AND
BREAKING DEFORMATION TO BE SET TO DESIRED LEVEL

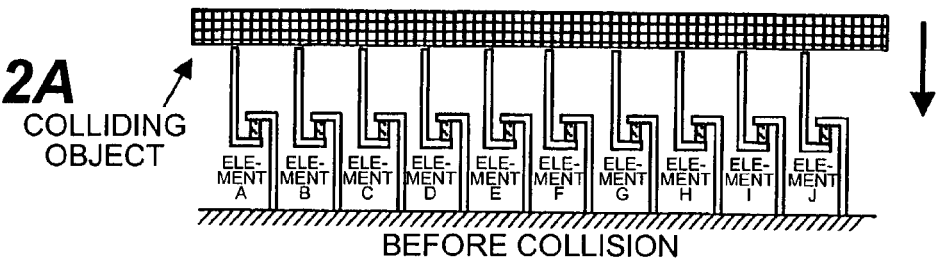
Fig. 22A COLLIDING OBJECT / ELEMENT A–J / BEFORE COLLISION
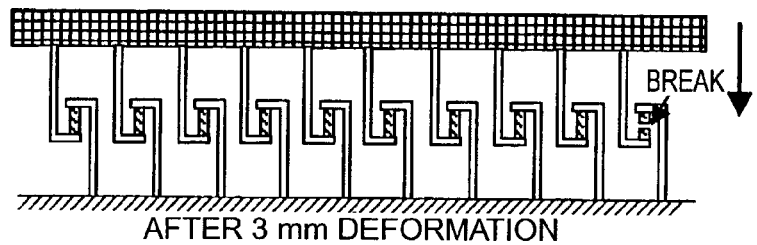
Fig. 22B BREAK / AFTER 3 mm DEFORMATION
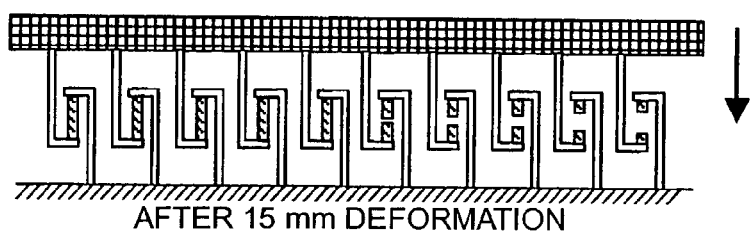
Fig. 22C AFTER 15 mm DEFORMATION
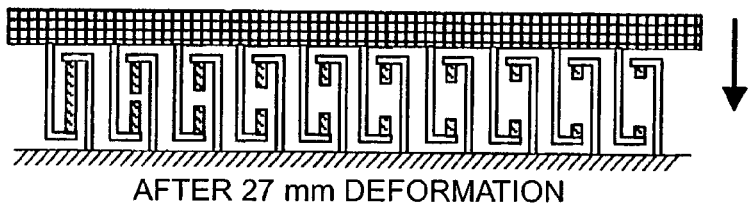
Fig. 22D AFTER 27 mm DEFORMATION
Fig. 23
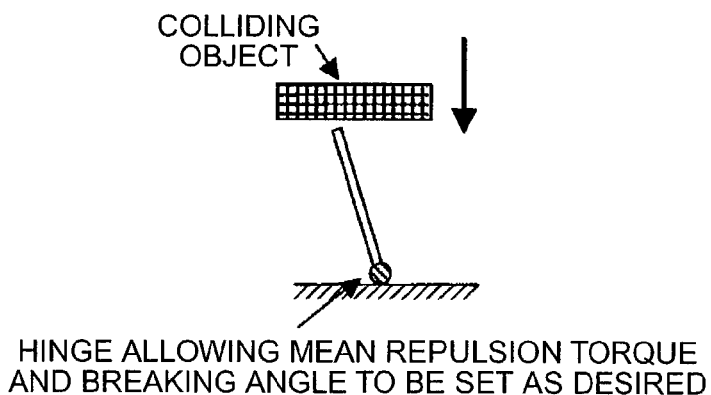
COLLIDING OBJECT
HINGE ALLOWING MEAN REPULSION TORQUE AND BREAKING ANGLE TO BE SET AS DESIRED

STRUCTURE ALLOWING MEAN
REPULSION AND BREAKING DEFORMATION
TO BE SET AS DESIRED

IMPACT ENERGY ABSORBING STRUCTURE

BACKGROUND OF THE INVENTION

1. Field of the Invention

The present invention relates to an impact energy absorbing structure which is used to absorb impact energy on the heads of passengers during collisions in vehicles, for example.

2. Related Background Art

In order to ensure higher levels of passenger protection in the interior of vehicles such as automobiles, the recent trend has been toward the establishment of increasingly stringent standards regarding passenger safety measures and the like. In the United States, in particular, the Federal Motor Vehicle Safety Standards have been strengthened (FMVSS 201U), resulting in more stringent regulations regarding measures for protecting passenger heads. In FMVSS 201U, dummy heads (mass 4.54 kg) referred to as free motion headforms (FMH) are used as the colliding object, which is caused to collide on an interior part (impact energy absorbing structure) at 24 km/h, and the total acceleration a (t) at the FMH center of gravity is measured.

FIG. 1 illustrates an image from such an impact test, showing a schematic example of the shape of such an impact energy absorbing structure. FIG. 2 illustrates an image of the deformation characteristics of the structure during the impact test, where the headform acceleration is shown relative to the deformation of the structure. In the figure, the dashed line shows the results obtained with a conventional structure, where the acceleration is greater in the second half than in the first half of deformation. Because the product of the headform acceleration and the structure deformation expresses the collision energy (per kilogram) absorbed by the structure, the distribution of absorbed energy is greater in the second half than in the first half.

In this test, the total acceleration a(t), measured from a sensor is treated with Equations (5) and (6), giving HIC(d). HIC(d) is stipulated at no more than 1000 in FMVSS 201U.

$$HIC = \text{MAX}\left\{\left[\frac{1}{(t_2 - t_1)}\int_{t_1}^{t_2} a \, dt\right]^{2.5} (t_2 - t_1)\right\}(t_2 - t_1 \leq 36 \text{ msec}) \quad (5)$$

$$HIC(d) = 0.75446 \times HIC + 166.4 < 1000 \quad (6)$$

The terms in brackets in Equation (5) express the mean, between $t_1$ and $t_2$, of the total acceleration measured by a triaxial accelerometer sensor, and HIC is the standard for assessing passenger head protection performance.

To study what type of structure will permit the HIC(d) to be minimized, most studies have thus far been based on the time-acceleration behavior of the colliding object. As illustrated by the dash-dot line in FIG. 2, cases in which the time-acceleration behavior is in the form of a rectangular wave, that is, cases in which the impact absorption energy is uniformly distributed over time (and thus uniformly distributed over deformation), are reportedly the most effective. As a result, a major issue in the design of actual products has been how to make the deformation behavior (time-acceleration behavior of colliding object) more closely resemble a rectangular wave.

SUMMARY OF THE INVENTION

There is a trend toward stronger automobile safety standards in the US, as noted above, as well as a desire for greater safety in various other countries. Some vehicle interior parts with which the heads of passengers more likely collide should therefore function to absorb impact energy efficiently, such as roof side garnishes covering roof side rails or pillar garnishes covering various pillars inside vehicles such as the front, center, and rear pillars. On the other hand, such interior parts should be structured to efficiently absorb impact energy with low deformation in order to ensure greater space inside the vehicle. There is thus a need to develop impact energy absorbing structures which meet the above standards while preserving the most space possible in the vehicle.

In view of the foregoing, an object of the present invention is to provide an impact energy absorbing structure capable of efficiently absorbing kinetic energy during collision to alleviate the impact to passenger heads, in particular, while preserving the space inside vehicles. It is particularly an object of the present invention to provide an impact energy absorbing structure with even better impact energy absorbing properties than impact energy absorbing structures having rectangular wave deformation behavior (time-acceleration behavior of the colliding object) which have conventionally been considered ideal.

For achieving such object, the impact energy absorbing structure of this invention is characterized in that when a certain colliding object collides with said impact energy absorbing structure at a certain velocity, the following Formula (1) is satisfied by the relationship between dimensionless displacement D, where the deformation of the impact energy absorbing structure is normalized by the permissible deformation, and the dimensionless energy E, where the kinetic energy absorbed by the impact energy absorbing structure is normalized by the kinetic energy of the colliding object prior to collision.

$$E > D \quad (1)$$

This makes it possible to provide an impact energy absorbing structure that is capable of efficiently absorbing kinetic energy during collision to alleviate the impact to passenger heads in particular while preserving space inside the vehicle, and that also has performance with a better impact energy absorbing pattern than the rectangular wave form which has conventionally been considered ideal. Although any material such as a resin, metal, or ceramic can be used for the material of the impact energy absorbing structure, resins are preferred because of advantages such as good formability, light weight, and ease of mass production.

Also the impact energy absorbing structure of this invention preferably comprises a substrate; an impact receiving member disposed parallel to the substrate; and a plurality of impact energy absorbing members that are disposed between the substrate and the impact receiving member, that deform while exerting repulsion on the colliding object, and that break when the critical deformation level is reached, wherein the critical deformation levels of each of the impact energy absorbing members are established stepwise within said permissible deformation range, and the repulsion of each of the impact energy absorbing members is set so as to meet the relationship between the dimensionless displacement D and dimensionless energy E defined in Formula (1). By differentiating properties of dimensionless energy (absorbed kinetic energy) relative to the dimensionless displacement of the aforementioned impact energy absorbing structure, the properties of dimensionless repulsion (load) relative to the dimensionless displacement of the impact energy absorbing structure can be found. The aforementioned structure makes it possible to easily produce an optimal model (model in which HIC(d) is minimized, with low permissible deformation) represented by such properties. That is, because dimensionless displacement is used as a parameter instead of time, the discrete values of such dimensionless displacement can correspond to the critical deformation of the impact energy absorbing members. Because the dimensionless repulsion is treated as a value, it can correspond to the synthetic repulsion of impact energy absorbing members that are not broken up, thereby making it possible to provide an impact energy absorbing structure with which an optimal model is readily realized.

BRIEF DESCRIPTION OF THE DRAWINGS

FIGS. 22A through 22D illustrate the process of the deformation of the impact energy absorbing structure in FIG. 20;

FIG. 23 illustrates another example of an element of the impact energy absorbing structure.

DESCRIPTION OF THE PREFERRED EMBODIMENTS

Embodiments of the invention will be described below with reference to the drawings. The background leading to the concept of the impact energy absorbing structure of the invention will be described first. As already noted, HIC(d) is represented by Formulas (5) and (6). Formula (5) represents the maximum mean for total acceleration (absolute value for acceleration, magnitude of acceleration vector) in the deformation process $(t_2-t_1)$ where the interval $(t_2-t_1)$ is no more than 36 msec. During actual tests, the deformation behavior of the structure is ascertained in the form of the acceleration value relative to the deformation, for example, and this value can be calculated based thereon, but even in those cases, calculations are still required to a certain extent.

$$HIC = MAX\left\{\left[\frac{1}{(t_2-t_1)}\int_{t_1}^{t_2} a\,dt\right]^{2.5}(t_2-t_1)\right\}(t_2-t_1 \leq 36 \text{ msec}) \qquad (5)$$

$$HIC(d) = 0.75446 \times HIC + 166.4 < 1000 \qquad (6)$$

The inventors attempted to find the structure of an impact energy absorbing structure which would provide a low HIC(d) while ensuring greater interior space by means of computer-aided optimization. Variables expressing the deformation behavior of various structures were thus given as parameters (design variables) to a computer in an attempt to use a certain kinetic model in order to calculate the process of the deformation of these structures. Although continuous functions can be treated in terms of the model, considering the complexity of the calculation itself of the HIC(d), it would be desirable to produce a simplified model for more efficient calculations.

The inventors therefore introduced the concept of deformation intervals, where the deformation behavior of a structure is divided into intervals, and adopted a method by which the continuous deformation method is simulated by means of such discontinuous deformation intervals. More specifically, the process from the initial deformation of the structure to the permissible deformation S is evenly divided into deformation intervals of equivalent deformation ($\Delta x = S/M$, where $\Delta x$: divided intervals, M: number of divisions), and the acceleration is assumed to be constant over each of the divided intervals. A model is produced by noting how much of the kinetic energy of the colliding object is absorbed by the structure during these intervals.

Figure 3:
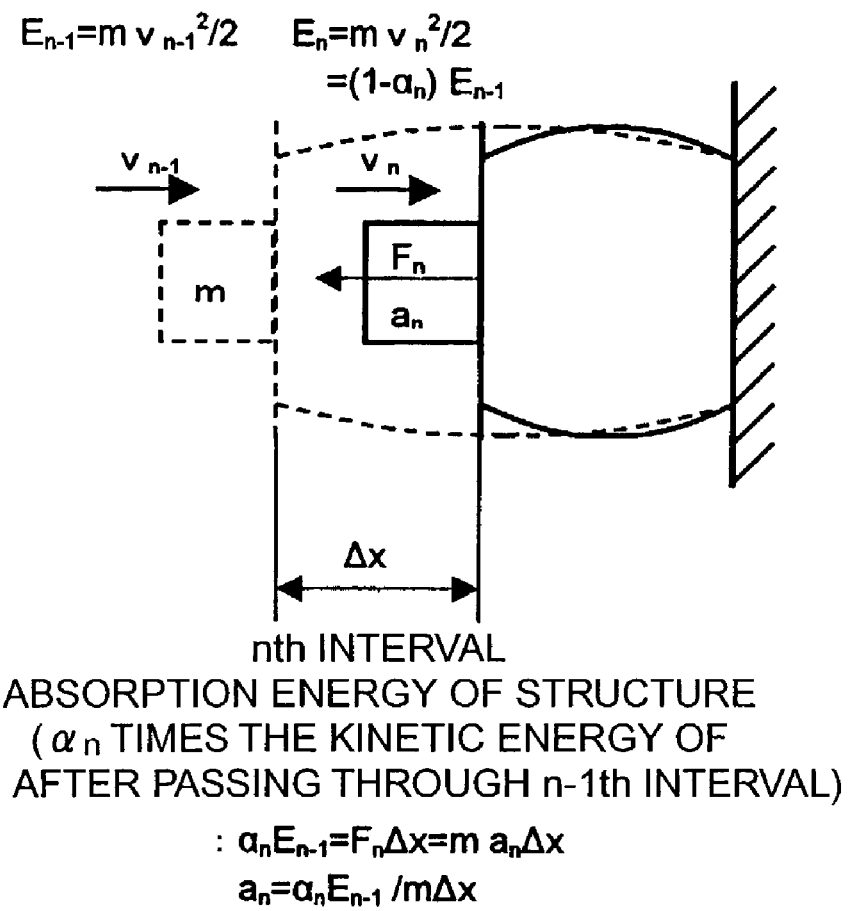
FIG. 3 illustrates a kinetic model for analyzing the deformation process during impact energy absorption.
Figure 4:
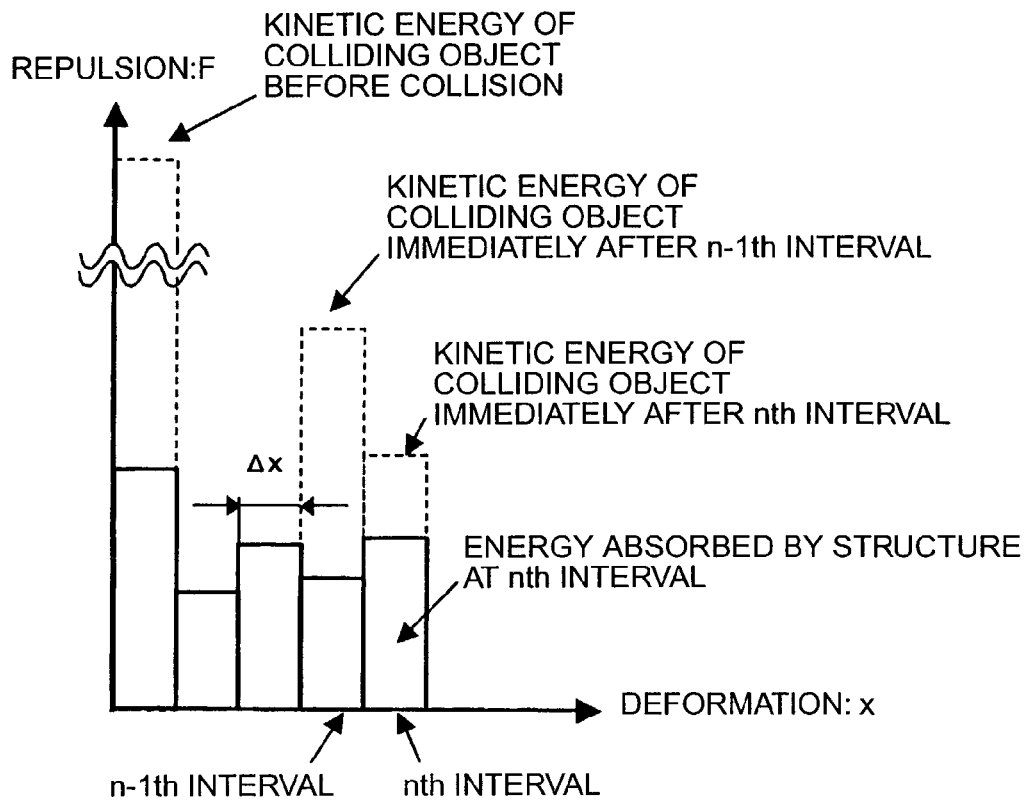
FIG. 4 is a graph showing the pattern of energy absorption during collision.
Figure 5:
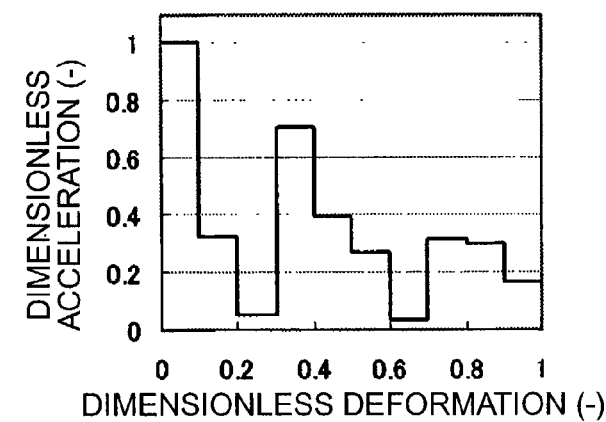
FIG. 5 is a graph showing deformation behavior with minimum HIC(d) in the case of 10 mm permissible deformation.
Figure 6:
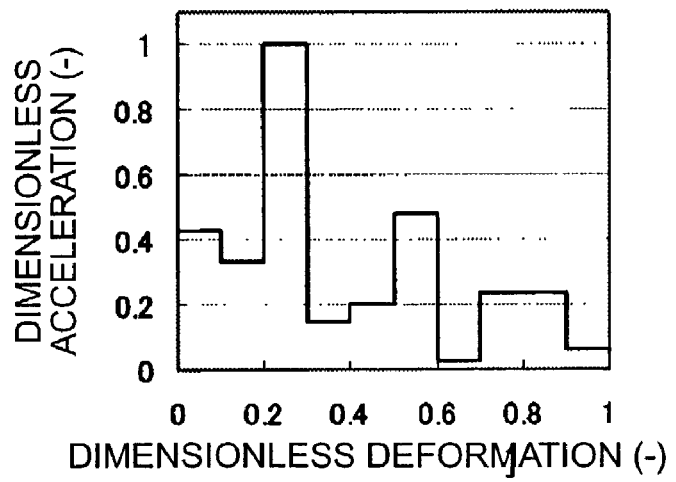
FIG. 6 is a graph showing deformation behavior with minimum HIC(d) in the case of 13 mm permissible deformation.
Figure 7:
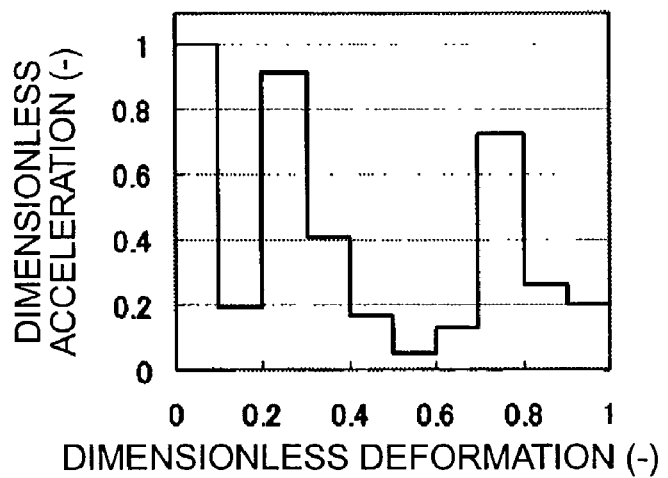
FIG. 7 is a graph showing deformation behavior with minimum HIC(d) in the case of 15 mm permissible deformation.
Figure 8:
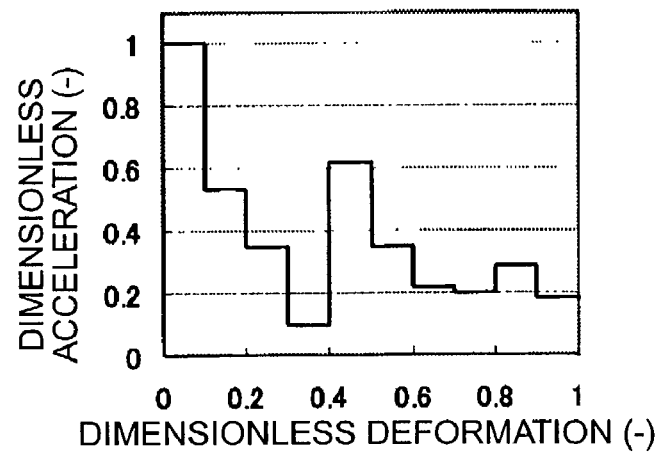
FIG. 8 is a graph showing deformation behavior with minimum HIC(d) in the case of 20 mm permissible deformation.
Figure 9:
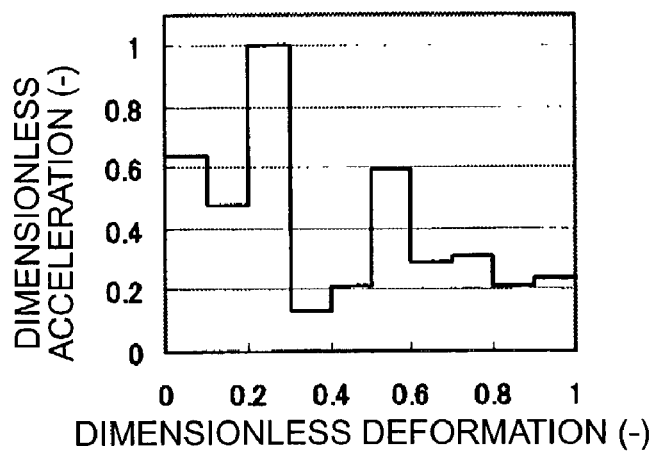
FIG. 9 is a graph showing deformation behavior with minimum HIC(d) in the case of 30 mm permissible deformation.
Figure 10:
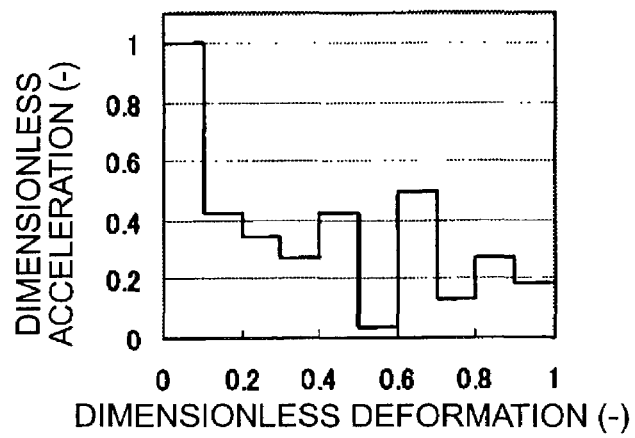
FIG. 10 is a graph showing deformation behavior with minimum HIC(d) in the case of 60 mm permissible deformation.

This will be illustrated with reference to FIGS. 3 and 4.

(1) The initial kinetic energy $E_0$ of the colliding object is first calculated based on the mass m (4.54 kg) of the colliding object and the collision velocity $v_0$ (24 km/h).

(2) The kinetic energy $E_{ab1}$ absorbed by the structure from the colliding object in the first interval is treated as $\alpha_1$ times the initial kinetic energy $E_0$ ($0 \leq \alpha_1 \leq 1$). Thus, the absorbed kinetic energy $E_{ab1}$ in the first interval is given as:

$$E_{ab1} = \alpha_1 E_0 \quad (7)$$
$$= mv_1^2/2 - mv_0^2/2 = (v_1 - v_0)(v_1 + v_0)m/2$$
$$= [(v_1 - v_0)/\Delta t]m[\Delta t(v_1 + v_0)/2]$$
$$= a_1 m \Delta x$$

Here, $v_1$ is the velocity of the colliding object at the point in time where the initial interval is completed. Accordingly, the acceleration $a_1$ at that interval is $\alpha_1 \cdot E_0/(m\Delta x)$, and the kinetic energy $E_1$ of the colliding object having passed through the interval is $(1-\alpha_1) \cdot E_0$.

(3) Similarly, the kinetic energy $E_{abn}$ absorbed at the nth interval is given as:

$$E_{abn} = \alpha_n E_{n-1} = a_n m \Delta x \quad (8)$$

The acceleration $a_n$ at that interval is $\alpha_n \cdot E_{n-1}/(m\Delta x)$, and the kinetic energy $E_n$ of the colliding object having passed through the interval is given as $(1-\alpha_n) \cdot E_{n-1}$. Because the energy $(\alpha_n \cdot E_{n-1})$ absorbed by the structure at the nth interval is $a_n(m\Delta x)$, it is proportional to the acceleration $a_n$ at that interval.

(4) It is only in the final Mth interval $\alpha_M=1.0$, in consideration of the fact that all the kinetic energy is consumed as a result of bottoming out.

(5) The time $\Delta t_n$ ($\Delta t_n = (v_n - v_{n-1})/a_n$ [$a_n \neq 0$], $\Delta t_n = \Delta x/V_{n-1}$ [$a_n = 0$]) it takes for the colliding object to pass through each interval is obtained from the velocities $V_{n-1}$ and $V_n$ before and after the interval through which the colliding object passes, and the acceleration $a_n$ during that interval.

Next, the pattern of deformation with minimized HIC(d) defined in Equations (5) and (6) is determined using computer-aided optimization based on the simplified kinetic model of collision described above. In the present embodiment, optimization is achieved using $\alpha_n$ ($0 \leq \alpha_n \leq 1$:n=1, 2, . . . , M) as the design variable at each interval and the HIC(d) obtained from a (t) as the evaluation function. "iSIGHT" (ver 5.1) of Engineous Software, Inc. can be used as optimization software, and simulated annealing can be used as the optimization method. M, which is the number of interval divisions, is determined according to the balance between the necessary accuracy and the computing load, but is preferably about $4 \leq M \leq 20$. As the result of the calculations, the HIC(d) value (minimum value) is output in combination with $\alpha_n$ ($0 \leq \alpha_n \leq 1$:n=1, 2, . . . , M) giving the minimum value for HIC(d).

EXAMPLES

The patterns of $\alpha_n$ ($0 \leq \alpha_n \leq 1$:n=1, 2, . . . , M) with minimum HIC(d) were actually determined for various permissible deformation levels S by the method described above. M=10 was established using "iSIGHT" (ver 5.1) by Engineous Software, Inc. as the optimization software and simulated annealing as the optimization method. The permissible deformation S serving as a condition was suitably spread out between 10 and 60 mm.

FIGS. 5 through 10 show the deformation behavior at the various permissible deformation levels S calculated on the basis of the patterns of $\alpha_n$ ($0 \leq \alpha_n \leq 1$:n=1, 2, . . . , M) giving minimum values. In these figures, the horizontal axis is the dimensionless deformation, which is obtained by dividing the deformation by the permissible deformation S, and the vertical axis is the dimensionless acceleration, which is obtained by dividing the acceleration of each deformation interval by the maximum acceleration. Because the product of the acceleration and deformation is proportional to the energy absorbed by the structure as described above, these figures show the energy absorption patterns of the structures.

Figure 1:
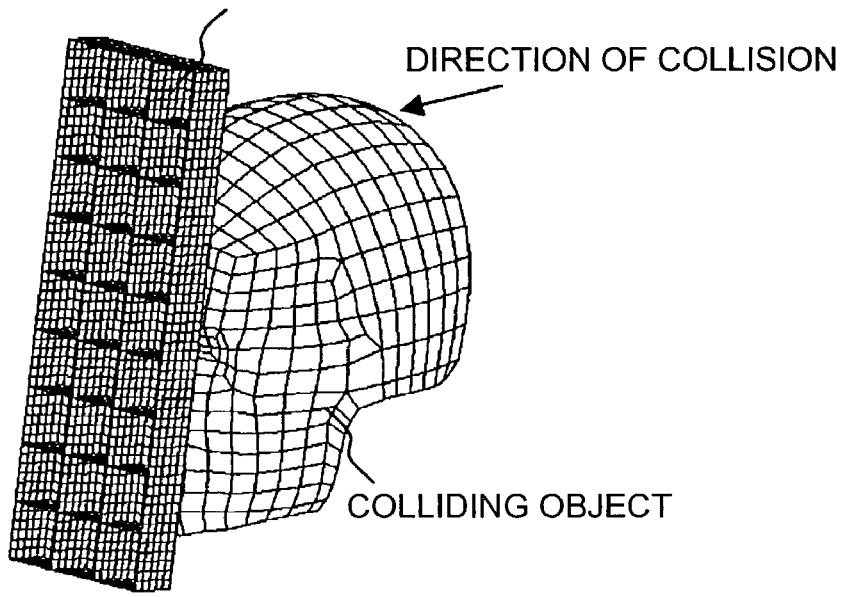
FIG. 1 shows an image in an impact test.
Figure 2:
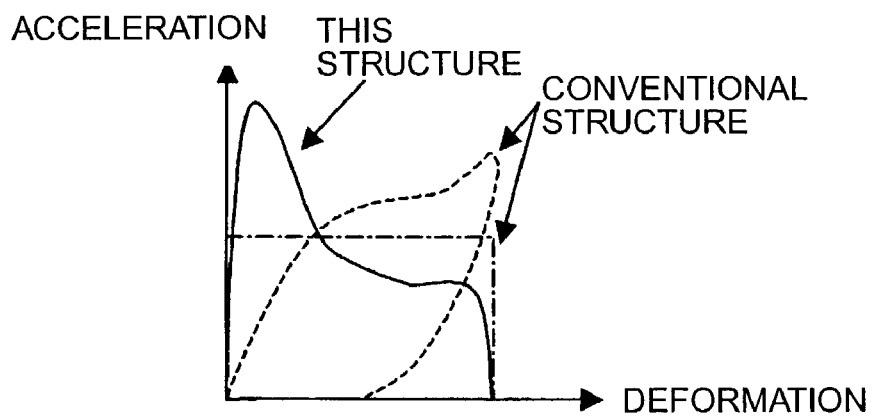
FIG. 2 is a graph of the impact energy absorbing properties of an impact energy absorbing structure.
Figure 11:
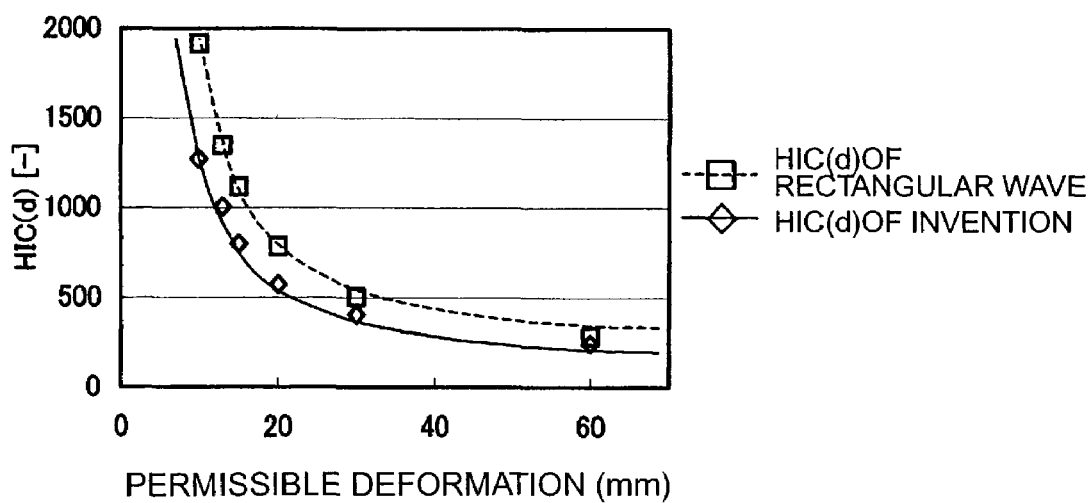
FIG. 11 is a graph comparing the HIC(d) values found in the patterns of deformation behavior in FIGS. 5 through 10 compared to a conventional example.
Figure 12:
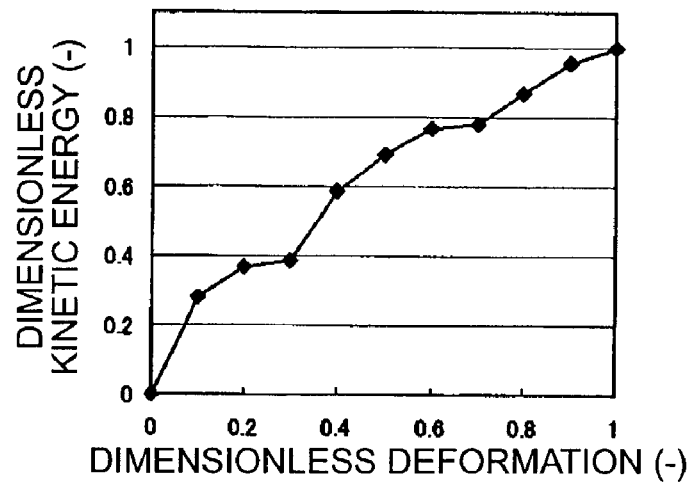
FIG. 12 is a graph showing the relationship between dimensionless kinetic energy and dimensionless deformation in the case of 10 mm permissible deformation.
Figure 13:
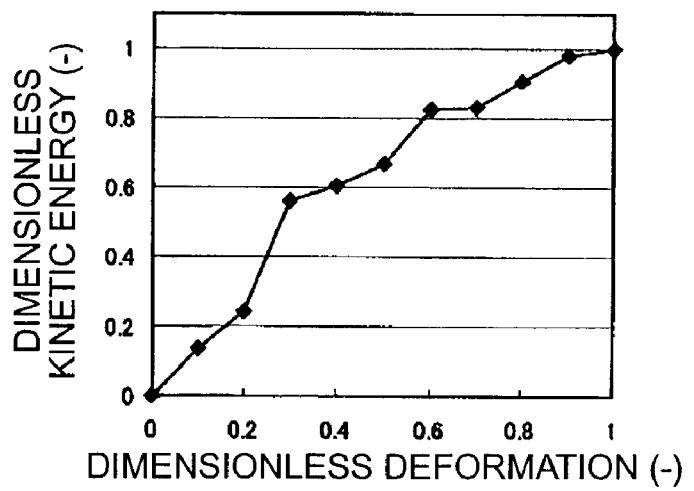
FIG. 13 is a graph showing the relationship between dimensionless kinetic energy and dimensionless deformation in the case of 13 mm permissible deformation.
Figure 14:
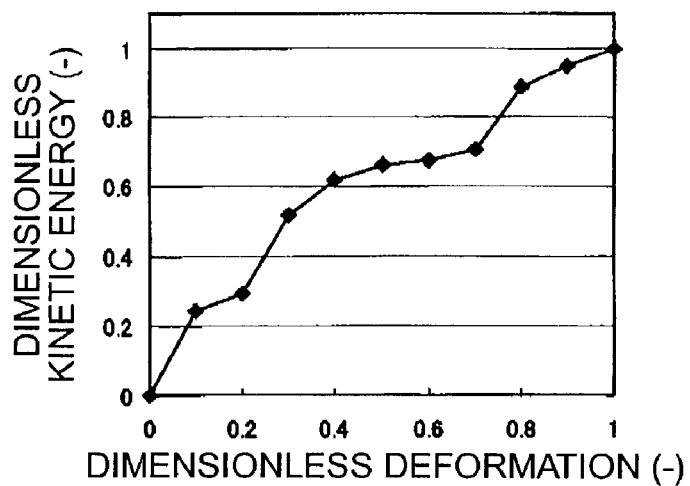
FIG. 14 is a graph showing the relationship between dimensionless kinetic energy and dimensionless deformation in the case of 15 mm permissible deformation.
Figure 15:
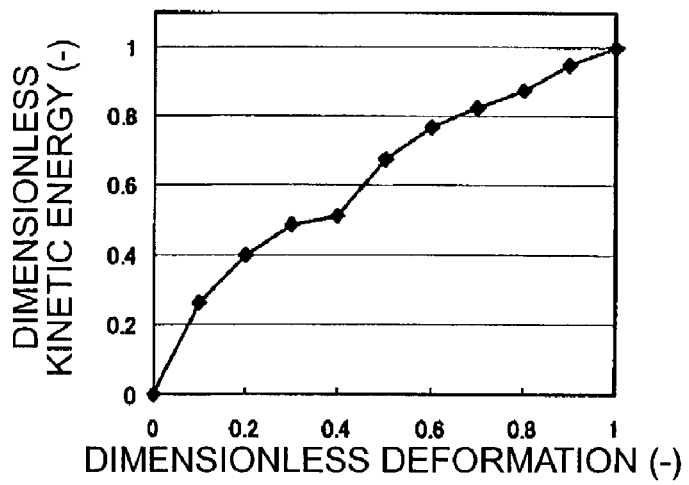
FIG. 15 is a graph showing the relationship between dimensionless kinetic energy and dimensionless deformation in the case of 20 mm permissible deformation.
Figure 16:
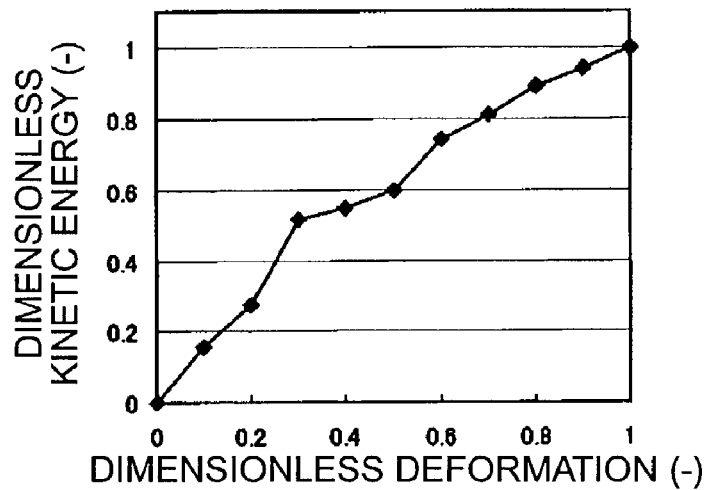
FIG. 16 is a graph showing the relationship between dimensionless kinetic energy and dimensionless deformation in the case of 30 mm permissible deformation.
Figure 17:
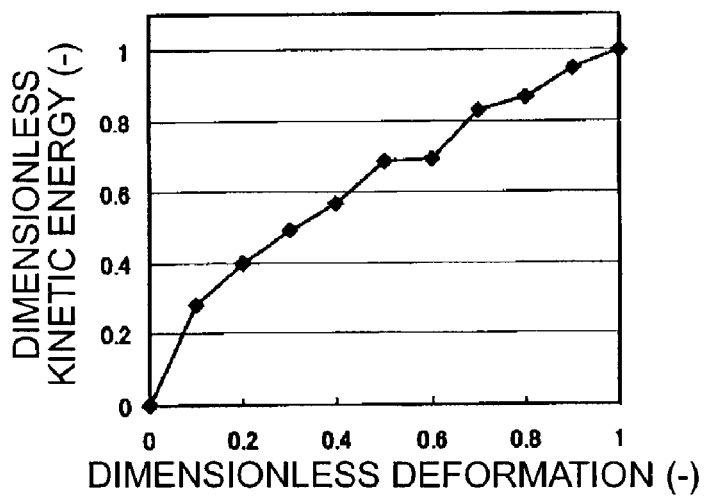
FIG. 17 is a graph showing the relationship between dimensionless kinetic energy and dimensionless deformation in the case of 60 mm permissible deformation.

The figures show that the minimum HIC(d) is given not by the rectangular wave indicated by the dash-dot line in FIG. 2, which has conventionally been considered ideal, but rather, as shown by the pattern outlined by the solid line C in FIG. 2, in a wave form characterized by maximum acceleration soon after collision and subsequently diminishing acceleration. The common structure shown by the dashed line in FIG. 2 also differs in that the acceleration during deformation is greater in the first half than the second half of the deformation process. In FIG. 11, the minimum value for HIC(d) given by the aforementioned pattern of deformation behavior is compared to that of the rectangular wave form.

The requirements for structures having good impact energy absorbing properties were then determined based on the features common to wave form patterns at varying permissible deformation levels having such an optimized pattern. In the following analysis, the dimensionless kinetic energy, which was obtained by dividing the kinetic energy (=energy absorbed by the structure) by the kinetic energy of the colliding object prior to collision, was used instead of the acceleration of the colliding object for the vertical axis. FIGS. 12 through 17 are graphs cumulatively showing the absorption energy (optimal pattern lines) relative to the dimensionless deformation at each permissible deformation level S, and these are summarized in FIG. 18. Table 1 gives these dimensionless absorption energy values.

TABLE 1

| Dimensionless Deformation D | PERMISSIBLE DEFORMATION (mm) | | | | | |
| --- | --- | --- | --- | --- | --- | --- |
| | 10 | 13 | 15 | 20 | 30 | 60 |
| 0 | 0.000 | 0.000 | 0.000 | 0.000 | 0.000 | 0.000 |
| 0.1 | 0.280 | 0.136 | 0.246 | 0.260 | 0.156 | 0.278 |
| 0.2 | 0.372 | 0.243 | 0.293 | 0.399 | 0.273 | 0.397 |
| 0.3 | 0.386 | 0.561 | 0.518 | 0.490 | 0.517 | 0.495 |
| 0.4 | 0.585 | 0.607 | 0.620 | 0.514 | 0.548 | 0.570 |
| 0.5 | 0.696 | 0.671 | 0.662 | 0.676 | 0.600 | 0.688 |
| 0.6 | 0.771 | 0.823 | 0.675 | 0.768 | 0.744 | 0.697 |
| 0.7 | 0.780 | 0.830 | 0.708 | 0.825 | 0.815 | 0.834 |
| 0.8 | 0.869 | 0.906 | 0.887 | 0.878 | 0.891 | 0.870 |
| 0.9 | 0.953 | 0.981 | 0.950 | 0.953 | 0.942 | 0.948 |
| 1.0 | 1.000 | 1.000 | 1.000 | 1.000 | 1.000 | 1.000 |

Figure 18:
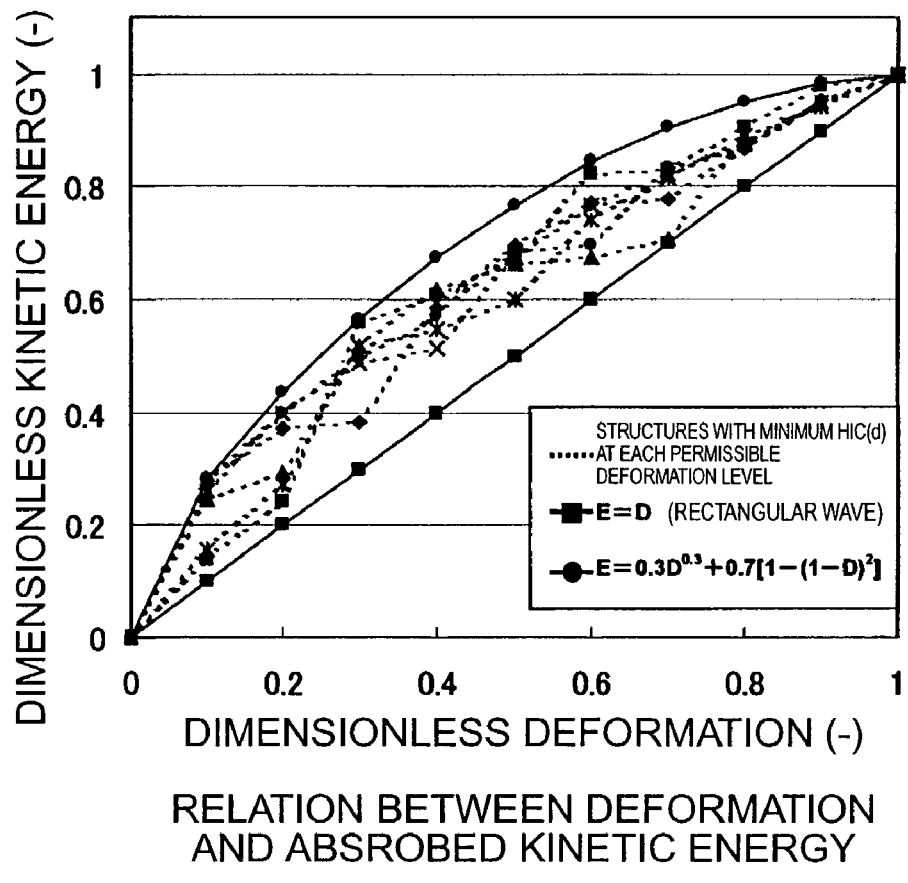
FIG. 18 is a graph showing the relationship between dimensionless kinetic energy and dimensionless deformation in FIGS. 5 through 10 compared to a rectangular wave form.

FIG. 18 shows the pattern of a rectangular wave form. The cumulative absorption energy properties in the case of a rectangular wave form are represented by a straight line $$E = D \quad (9)$$

where E is the dimensionless energy of the vertical axis, and D is the dimensionless deformation of the horizontal axis. As indicated in the figure, the optimal lines (broken lines) are in the arc-shaped region above the straight line E=D. The curve encompassing in the upper side the group of absorption pattern lines giving the minimum HIC(d), is defined as:

$$E=f(D)=0.3D^{0.3}+0.7[1-(1-D)]^2] \quad (10)$$

A more detailed discussion is given below.

A closer look at FIG. 18 reveals that the group of optimal pattern lines (broken lines) resembles a curve that is obtained by uniformly expanding the straight line (9) toward the curve (10). The function g (D) expressing such a curve group is given by the following equation.

$$E=g(D)=(1-\beta)D+\beta f(D) \quad (11)$$

When $\beta=0$, $g(D)=D$, in other words, the straight line (9), and when $\beta=1$, $g(D)=f(D)$, in other words, the curve (10). When $0<\beta<1$, the curve group is in the region between straight line (9) and curve (10), and when $\beta<1$, the curve group is above curve (10).

HIC(d) was calculated for cases where $\beta$ was suitably varied in the region $0<\beta$, that is, the region higher than straight line (9). The results are given in Table 2. Although the numerical values themselves for HIC(d) in the curve group (11) vary depending on the permissible deformation, the change tends to be the same. That is, the values gradually become lower the greater than 0 that $\beta$ becomes, resulting in a minimum of around $\beta=0.5$ to 0.75, and the values then gradually increase. The values are better than in the case of a rectangular wave at all permissible deformation levels in the range $0<\beta\leq1.06$. In the range $1.07\leq\beta\leq1.19$, the values are better than the rectangular wave form at some of the permissible deformation levels.

TABLE 2

| | PERMISSIBLE DEFORMATION (mm) | | | | | |
|---|---|---|---|---|---|---|
| | 10 | 13 | 15 | 20 | 30 | 60 |
| MINIMUM HIC(d) AT VARYING PERMISSIBLE DEFORMATION LEVELS | 1270 | 1010 | 799 | 575 | 405 | 246 |
| E = D ($\beta$ = 0) | 1920 | 1350 | 1120 | 785 | 503 | 285 |
| $\beta$ = 0.01 | 1910 | 1340 | 1110 | 782 | 501 | 285 |
| $\beta$ = 0.1 | 1780 | 1290 | 1070 | 749 | 484 | 279 |
| $\beta$ = 0.25 | 1690 | 1210 | 1000 | 711 | 461 | 271 |
| $\beta$ = 0.5 | 1470 | 1050 | 869 | 629 | 413 | 252 |
| $\beta$ = 0.75 | 1430 | 1070 | 871 | 622 | 408 | 253 |
| E = 0.3D$^{0.3}$ + 0.7 [1 − (1 − D)$^2$] ($\beta$ = 1.0) | 1680 | 1280 | 1020 | 724 | 456 | 270 |
| $\beta$ = 1.01 | 1680 | 1290 | 1030 | 741 | 457 | 272 |
| $\beta$ = 1.06 | 1750 | 1340 | 1070 | 767 | 472 | 277 |
| $\beta$ = 1.07 | 1770 | 1350 | 1070 | 772 | 474 | 278 |
| $\beta$ = 1.08 | 1780 | 1360 | 1080 | 779 | 477 | 279 |
| $\beta$ = 1.1 | 1800 | 1390 | 1100 | 789 | 481 | 280 |
| $\beta$ = 1.19 | 1910 | 1500 | 1180 | 842 | 509 | 290 |
| $\beta$ = 1.195 | 1920 | 1510 | 1180 | 845 | 510 | 291 |

As indicated above, the curve group (11) giving good HIC(d) are in the range $0<\beta\leq1.19$ (such curves are referred to below as the good curves). However it is assumed that good properties may be expected even in cases not completely consistent with these good curves. That is because the optimal pattern lines such as those in FIG. 18 are not in fact necessarily found in Equation (11) for the good curves. The extent to which the optimal pattern lines deviate from the good curves should be within a permissible range. The extent of this deviation was then studied.

Figure 19:
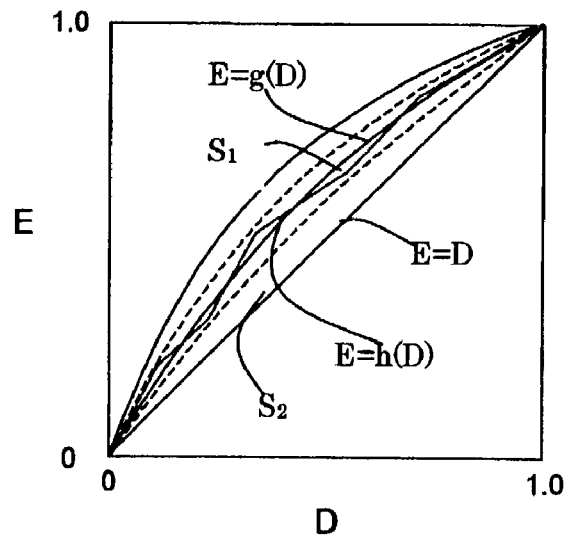
FIG. 19 is a graph illustrating the relationship between a characteristic curve and an approximation curve.

An approximation curve, that is, a good curve E−g (D) most closely resembling the various optimal pattern lines (these are expressed as E=h(D)) in FIG. 18, was determined by the least squares method. The results are given in Table 3 as the values for $\beta$ in the approximation curve. The deviation index between the approximation curve and the broken line E=h(D) was then determined by the method shown in FIG. 19. That is, the sum $S_1$ of the area of the regions divided by curve E=g(D) and the optimal pattern line E=h(D) was determined, the area $S_2$ of the region divided by curves E=f(D) and E=D was determined, and the "deviation index" $R_1$ was defined by the ratio between the two (=$S_1/S_2$). The results are similarly shown in Table 3. According to this, the deviation $R_1$ is considerably high when the permissible deformation is low, but as a whole, $R_1<33\%$ is considered the permissible range.

TABLE 3

| | PERMISSIBLE DEFORMATION (mm) | | | | | |
|---|---|---|---|---|---|---|
| | 10 | 13 | 15 | 20 | 30 | 60 |
| $\beta$ OF THE APPROXIMATION CURVE | 0.377 | 0.339 | 0.453 | 0.342 | 0.491 | 0.342 |
| DEVIATION $R_1$ | 0.332 | 0.711 | 0.546 | 0.169 | 0.212 | 0.255 |

Another method for determining the deviation ("deviation factor") between the approximation curve and optimal line E=h(D) is to determine the maximum ratio between the absorption energy in the optimal patterns in Table 1 and the absorption energy of the approximation curve determined as described above. The former method gives an index of the deviation as a whole, whereas the deviation obtained in this case can be considered an index of local deviation. The results are given in Table 4. According to this, a deviation $R_2$ of $-30\%<R_2<30\%$ is considered a good range.

TABLE 4

| Dimensionless Deformation D | PERMISSIBLE DEFORMATION (mm) | | | | | |
|---|---|---|---|---|---|---|
| | 10 | 13 | 15 | 20 | 30 | 60 |
| 0 | (1.000) | (1.000) | (1.000) | (1.000) | (1.000) | (1.000) |
| 0.1 | 1.308 | 0.616 | 1.228 | 1.178 | 0.806 | 1.261 |
| 0.2 | 1.069 | 0.681 | 0.888 | 1.122 | 0.851 | 1.116 |
| 0.3 | 0.829 | 1.179 | 1.163 | 1.031 | 1.187 | 1.042 |
| 0.4 | 1.023 | 1.042 | 1.125 | 0.884 | 1.014 | 0.980 |
| 0.5 | 1.042 | 0.991 | 1.023 | 0.999 | 0.941 | 1.016 |
| 0.6 | 1.024 | 1.080 | 0.920 | 1.008 | 1.026 | 0.915 |
| 0.7 | 0.942 | 0.993 | 0.871 | 0.987 | 1.012 | 0.998 |
| 0.8 | 0.971 | 1.006 | 1.003 | 0.975 | 1.015 | 0.966 |
| 0.9 | 1.001 | 1.027 | 1.005 | 0.997 | 1.000 | 0.992 |
| 1.0 | 1.000 | 1.000 | 1.000 | 1.000 | 1.000 | 1.000 |
| MAXIMUM VALUE | 1.308 | 1.179 | 1.228 | 1.178 | 1.187 | 1.261 |
| MINIMUM VALUE | 0.829 | 0.616 | 0.871 | 0.884 | 0.806 | 0.915 |

Below is a description of a method for actually producing an impact energy absorbing structure which has been designed by stipulating the profile of the absorption kinetic energy per unit deformation as described above. In this example, the impact energy absorbing structure that is produced has a permissible deformation of 30 mm, with an impact energy absorption properties pattern represented by a good curve in which $\beta=0.5$. 10 deformation intervals are set in this case. The absorption energy at each deformation interval of the impact energy absorbing structure having such an impact energy absorbing pattern can be calculated from the good curve in which $\beta=0.5$, as shown in Table 5.

Thus, because $$E_{abn} = a_n m \Delta x = f_n \Delta x \quad (12)$$

from Equation (8), the absorption energy can be calculated as the mean repulsion $f_n$ at the subject interval, based on this equation. The results are given in Table 5. The "ratio between structures breaking at the subject interval and structures at the interval 10" in Table 5 means the proportion of the repulsion of the impact energy absorbing members breaking at the interval relative to the synthetic repulsion of the total impact energy absorbing members left over the interval.

TABLE 5

| INTERVAL | DEFORMATION AT THE END OF THE INTERVAL (mm) | DIMENSIONLESS ENERGY ABSORBED BEFORE THE END OF THE INTERVAL (-) | DIMENSIONLESS ENERGY ABSORBED AT THE INTERVAL (-) | ENERGY ABSORBED AT THE INTERVAL (J) | MEAN REPULSION OF THE INTERVAL (N) | RATIO BETWEEN STRUCTURES BREAKING AT THE SUBJECT INTERVAL AND STRUCTURES AT INTERVAL 10 (-) |
|---|---|---|---|---|---|---|
| 1 | 3 | 0.191678 | 0.191678 | 103.1833 | 34394.44 | 1.114051 |
| 2 | 6 | 0.318555 | 0.126877 | 68.29988 | 22766.63 | 0.213270 |
| 3 | 9 | 0.433027 | 0.114472 | 61.62192 | 20540.64 | 0.164180 |
| 4 | 12 | 0.537949 | 0.104922 | 56.48109 | 18827.03 | 0.146693 |
| 5 | 15 | 0.634338 | 0.096389 | 51.88781 | 17295.94 | 0.138213 |
| 6 | 18 | 0.722688 | 0.08835 | 47.56004 | 15853.35 | 0.133388 |
| 7 | 21 | 0.803279 | 0.080591 | 43.38337 | 14461.12 | 0.130352 |
| 8 | 24 | 0.876287 | 0.073009 | 39.30176 | 13100.59 | 0.128304 |
| 9 | 27 | 0.941833 | 0.065546 | 35.28426 | 11761.42 | 0.126852 |
| 10 | 30 | 1 | 0.058167 | 31.31225 | 10437.42 | 1 |

In such an impact energy absorbing structure having such a mean repulsion $f_n$ distribution at each interval, the mean repulsion $f_1$ is in force at the first interval 1, the mean repulsion $f_2$ is in force at the next interval 2, and the mean repulsion $f_n$ is in force at interval n. Since ordinarily $f_n \neq f_{n-1}$, it is necessary to adjust the quantity of the structure at stages where the interval is changed. In this example, because the mean repulsion becomes lower (uniformly diminishes) as deformation progresses, the quantity of the structure involved in the deformation gradually diminishes.

Figure 20:
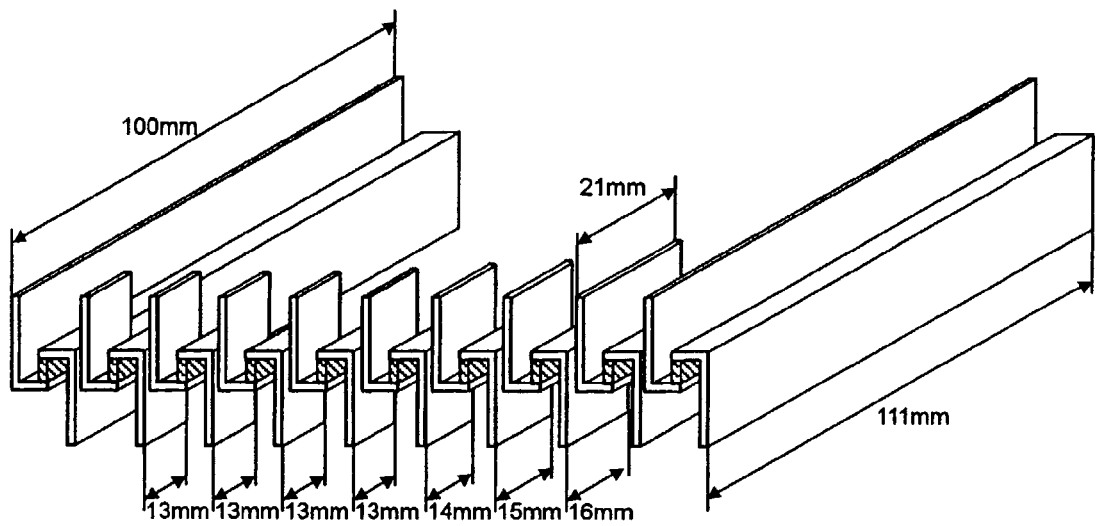
FIG. 20 is an oblique view of a specific example of an impact energy absorbing structure having the desired properties.
Figure 21:
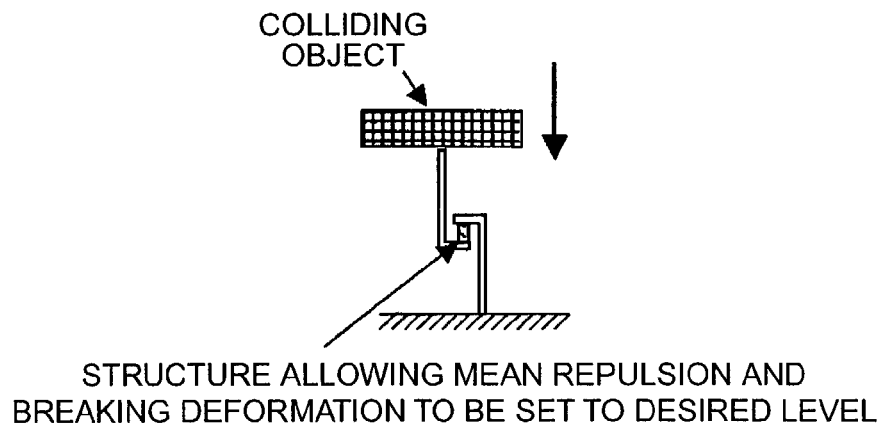
FIG. 21 illustrates elements of the impact energy absorbing structure in FIG. 20.

FIG. 20 illustrates an embodiment of the impact energy absorbing structure of the invention for realizing this. In this case, a plurality of tensile structural elements for which the mean repulsion and break-down deformation can be adjusted to the desired level, such as that shown in FIG. 21, are used for each deformation interval. That is, tensile structural elements with the breaking deformation set to break down after having passed through each deformation interval are arranged in rows so that each element independently undergoes tensile deformation. Accordingly, the breaking deformation of each structural element is set so that the elements would break at every deformation interval breadth $\Delta x$. The material for the structural elements was selected and/or the cross section area was set so that the remaining parts involved in deformation at each deformation interval were capable of bearing the mean repulsion required for the deformation intervals.

Ways to ensure that the structural elements have such different breaking deformation levels include selecting a suitable material, changing the length of the material, or both. Ways to set the mean repulsion include selecting a suitable material, changing the cross section area, or both. In the illustrated example, structural elements A through J are arranged in rows. They are composed by attaching channel members having an L-shaped cross section to the edges of the structural members, where the other edge of one channel member is joined to a substrate, and the other edge of the other channel member extends toward the colliding object.

In this example, the material of the structural members was the same. The breaking deformation was therefore adjusted by the length in the direction of collision (not shown in figure; same length), and the mean repulsion was adjusted by the cross section area. In this example, the cross section area was adjusted by varying the depth of the structural elements as shown in FIG. 20. In such an impact energy absorbing structure, as illustrated in FIGS. 22A through 22D, the structural elements A through J break in sequence as the deformation progresses one deformation interval breadth $\Delta x$ at a time, modifying the mean repulsion at each deformation interval, and thereby giving the intended impact energy absorbing properties pattern.

Tensile structural elements can be used in such an impact energy absorbing structure to allow the timing involved in the deformation of the structural elements to be set as desired. The breaking deformation and mean repulsion can be independently set by changing the material or dimensions, thereby allowing the desired impact energy absorbing properties pattern to be brought about. The aforementioned example was of a case in which the absorption energy, that is, the mean repulsion, in the impact energy absorbing properties pattern diminished uniformly, but for patterns which include cases of increasing repulsion, the channel members should be shortened in the direction of collision, for example, so that some of the structural elements involved in the deformation will deform more slowly than others.

Figure 24A:
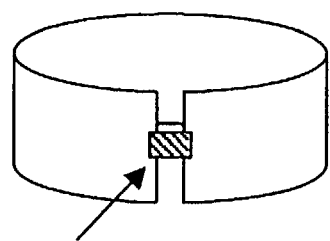
FIG. 24A illustrates another example of an element of the impact energy absorbing structure.
Figure 24B:
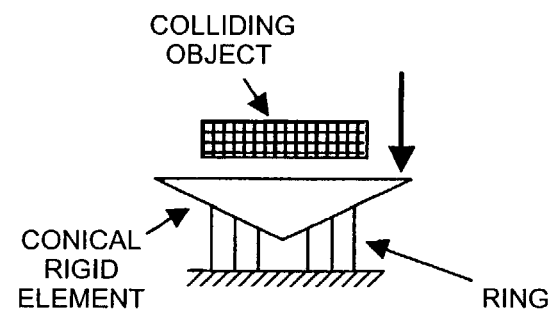
FIG. 24B illustrates an example of an impact energy absorbing structure using such an element.

FIG. 23, which is another example of a structural element, illustrates a torsional structural element which exploits the torsional deformation of the structural member. This may involve fixing one end of a cylindrical structural member, for example, to a substrate, and attaching a handle to the other end, allowing the mean torque and breaking angle to be set as desired by selecting the material or shape/dimensions. In FIGS. 24A and 24B, a plurality of structural elements comprising both ends of a sheet formed in a ring around the structural member are coaxially disposed on a substrate, and conical rigid elements are coaxially disposed on the colliding object side, where the structural members undergo tensile deformation and break in sequence as the ring widens. Because the parts are coaxially disposed, the structure can be more compact than that illustrated in FIG. 21.

What is claimed is:

1. An impact energy absorbing structure for absorbing the kinetic energy of a colliding object by means of its own deformation, wherein when a certain colliding object collides with said impact energy absorbing structure at a certain velocity, the following Formula (1) is satisfied by which is defined by normalizing the deformation of the impact energy absorbing structure by the permissible deformation, and the dimensionless energy E, which is defined by normalizing the kinetic energy that has been absorbed by the impact energy absorbing structure until the achievement of the deformation by the kinetic energy of the colliding object prior to the collision:

$$E>D \qquad (1),$$

wherein E>D is constantly satisfied throughout 0<D<1.

2. The impact energy absorbing structure according to claim 1, wherein the following Formula (2) is satisfied by the relationship between the dimensionless displacement D and the dimensionless energy E:

$$E(1-\beta)D+\beta\{0.3D^{0.3}+0.7[1-(1-D)^2]\} \qquad (2)$$

where $\beta=1.19$.

3. The impact energy absorbing structure according to claim 1, wherein said certain colliding object and certain velocity are according to stipulations in the United States Federal Motor Vehicle Safety Standards (FMVSS).

4. The impact energy absorbing structure according to claim 1, comprising:
a substrate;
an impact receiving member disposed parallel to the substrate; and
a plurality of impact energy absorbing members that are disposed between the substrate and the impact receiving member, that deform while exerting repulsion on the colliding object, and that break when their critical deformation level is reached, wherein the critical deformation levels of each of the impact energy absorbing members are established stepwise within said permissible deformation range, and the repulsion of each of the impact energy absorbing member is set so as to meet the relationship between the dimensionless displacement D and dimensionless energy E defined in Formula (1).

5. The impact energy absorbing structure according to claim 4, wherein said certain colliding object is a 4.54 kg dummy head, and said certain velocity is 24 km/h.

6. An impact energy absorbing structure for absorbing the kinetic energy of a colliding object by means of its own deformation, wherein when a certain colliding object collides with said impact energy absorbing structure at a certain velocity, the characteristic curve showing the relationship between the dimensionless displacement D, which is defined by normalizing the deformation of the impact energy absorbing structure by the permissible deformation, and the dimensionless energy E, which is defined by normalizing the kinetic energy that has been absorbed by the impact energy absorbing structure until the achievement of the deformation by the kinetic energy of the colliding object prior to collision, substantially conforms to the approximation curve represented by Equation (3) below:

$$E=g(D)=(1-\beta)D+\beta(0.3D^{0.3}+0.7[1-(1-D)^2]) \qquad (3),$$

wherein $\beta$ is greater than 0 and E>D is constantly satisfied throughout 0<D<1.

7. The impact energy absorbing structure according to claim 6, wherein $\beta$ is in the range defined in Formula (4) below:

$$0<\beta 1.19 \qquad (4).$$

8. The impact energy absorbing structure according to claim 7, wherein in formula (4) $\beta$ is in the range defined by:

$$0.25<\beta 1.19.$$

9. The impact energy absorbing structure according to claim 7, wherein in formula (4) $\beta$ is in the range defined by:

$$0.5<\beta 1.19.$$

10. The impact energy absorbing structure according to claim 6, wherein the deviation index between the characteristic curve and the approximation curve in the entire deformation process is no more that 33%.

11. The impact energy absorbing structure according to claim 6, wherein the deviation factor between the characteristic curve and the approximation curve is no more than ±30%.

* * * * *